United States Patent [19]

Haeussinger

[11] 4,154,327

[45] May 15, 1979

[54] CONVERTIBLE BICYCLE HUB

[76] Inventor: John D. Haeussinger, 9566 Halberns Bd., Santee, Calif. 92071

[21] Appl. No.: 846,773

[22] Filed: Oct. 31, 1977

[51] Int. Cl.² ............................................. F16D 41/12
[52] U.S. Cl. ...................................... 192/64; 308/192
[58] Field of Search ..................... 192/46, 64; 308/192

[56] References Cited

U.S. PATENT DOCUMENTS 1,593,474   7/1926   Serrao .................................. 308/192

FOREIGN PATENT DOCUMENTS 114708   11/1900   Fed. Rep. of Germany ............. 192/64
514487    4/1920   France ..................................... 308/192
15951    of 1901   United Kingdom ...................... 192/64

*Primary Examiner*—Allan D. Herrmann

[57] ABSTRACT

A doubly convertible bicycle wheel hub assembly has an axle housing containing sealed dustproof precision bearings with the axle journalled therein, the ends of the axle housing having annular retainers thereon either one of which can be replaced by a specialized retainer-freewheel mount element which, when the freewheel mechanism is mounted thereto, converts the hub assembly for use on the rear wheel of a bicycle. The freewheel assembly itself utilizes an annular sprocket element for the bicycle chain drive which is very simply removable and replaceable by removing a threaded retainer ring such that the chain drive ratio can be altered without replacing the entire freewheel mechanism.

6 Claims, 6 Drawing Figures

CONVERTIBLE BICYCLE HUB

BACKGROUND OF THE INVENTION

The invention is in the field of bicycle wheel hubs and relates particularly to hubs used in bicycles designed for off-road use.

Before the advent of off-road-designed bicycles, bicycles traditionally, or at least in the last few years, have utilized front and rear wheel hub assemblies which are substantially different from one another and by no means interchangeable. In addition to the rear wheel hub having an integral freewheel mechanism mounting sleeve, the rear hub axle, and thus the axle housing and bearings, were ordinarily larger than the comparable parts of the front wheel hub.

However, the recent trend in off-road bicycle design is to provide both axles and the accompanying parts in identical sizes. Because of the nature of off-road bikes it is also desirable to be able to easily change the size of the rear wheel sprocket because off-road bikes ordinarily do not have the sophisticated gear mechanisms of the ten-speed bicycles popular for street use. Despite this, it has been traditional to require the replacement of the entire freewheel mechanism, or at least a major portion including the sprocket itself and the outer ball race due to the contruction of the rear wheel hub.

In addition, because the mounting structure of the rear hub on which the free wheel mechanism is threaded is integral with the hub, front and rear hubs are both designed independently and separately even though axle size is now uniform front and back.

SUMMARY OF THE INVENTION

The present invention provides a doubly convertible hub assembly which can be used on either the front or the back wheels, depending on whether a retainer, or a retainer and sleeve combination, is mounted on one end of the axle housing. Also, the freewheel mechanism is made in such a way that the sprocket is reduced to the absolute minimum amount of structure and is very easily replaceable, so that a set of different size sprockets is not only practical but cheap.

The cost advantage in a single wheel hub, from the manufacturing as well as inventory point of view is clear, and the same advantages cost-wise not to mention the convenience, are inherent in the use of the specialized freewheel mechanism having the quickly removeable planar and annular sprocket.

DETAILED DESCRIPTION OF THE PREFERRED EMBODIMENT

Figure 1:
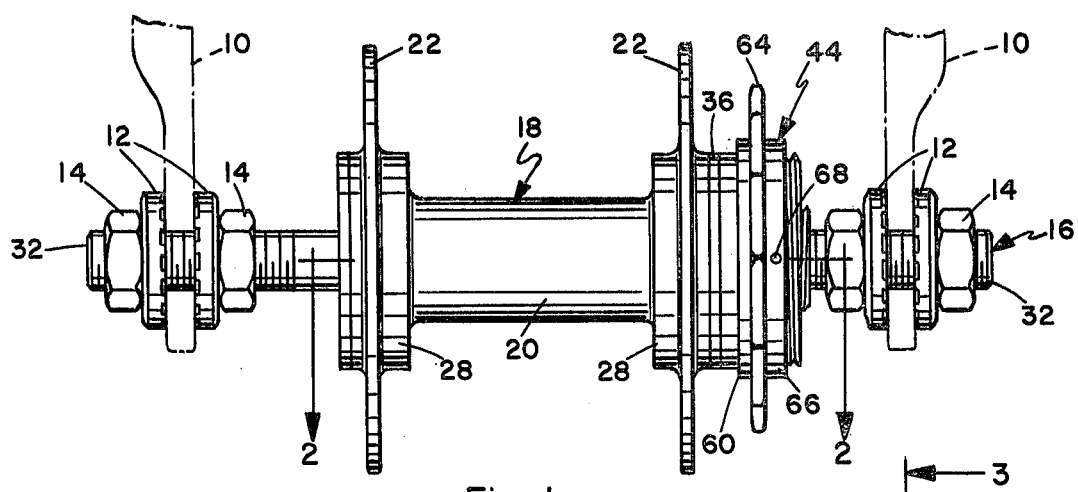
FIG. 1 is a side elevation view of the hub assembly for a rear wheel.

The hub assembly is shown in FIG. 1 mounted in the rear fork 10 of a bicycle. In conventional fashion, the individual prongs of the fork are captured between fluted washers 12 and axle nuts 14. The axle 16 spans the rear fork and supports the axle housing 18 which is journalled on the axle. The axle housing has a central cylindrical portion 20 and the ends are expanded to provide room for interior bearing seats, described later, and to form the spoke mounting flanges 22.

Figure 2:
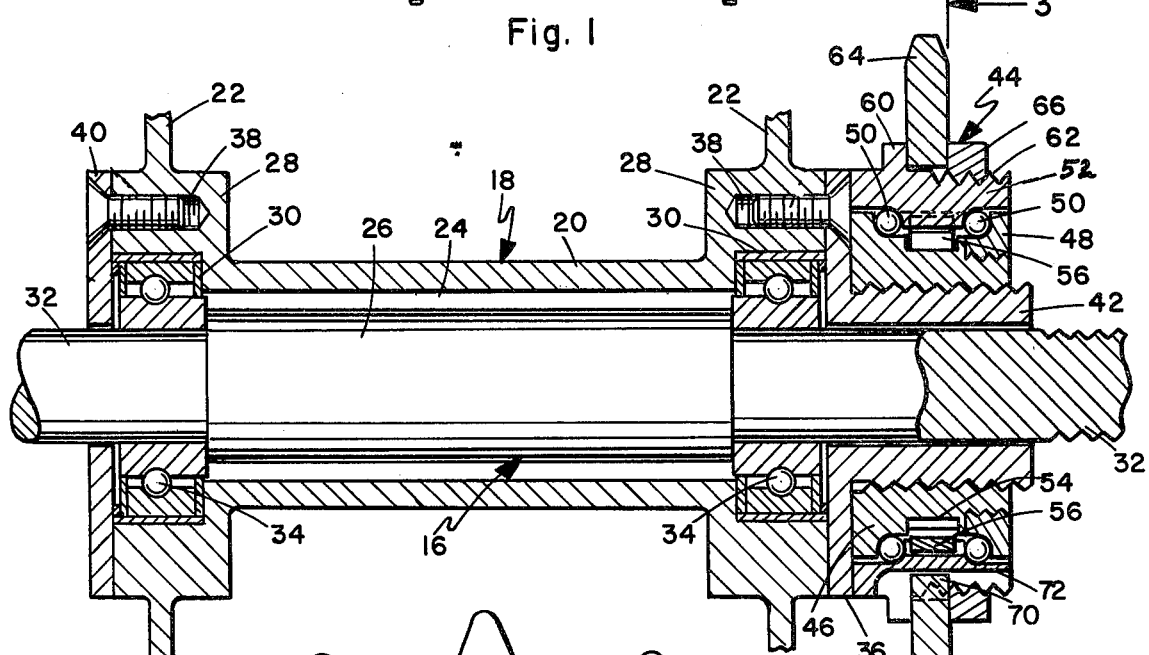
FIG. 2 is an enlarged sectional view taken on line 2—2 of FIG. 1.

From FIG. 2 it can be seen that the axle housing 18 defines a bore 24 which is spaced from the thick center portion 26 of the axle, and inside the enlarged ends 28 of the housing this bore is expanded, forming shoulders 30 defining seats for the bearings 34. These bearing rings are self-contained, sealed, dustproof precision bearings which engage the axle at the ends 32, which are of reduced radius such that the axle center portion 26 is axially captured between the bearings to prevent floating.

Figure 6:
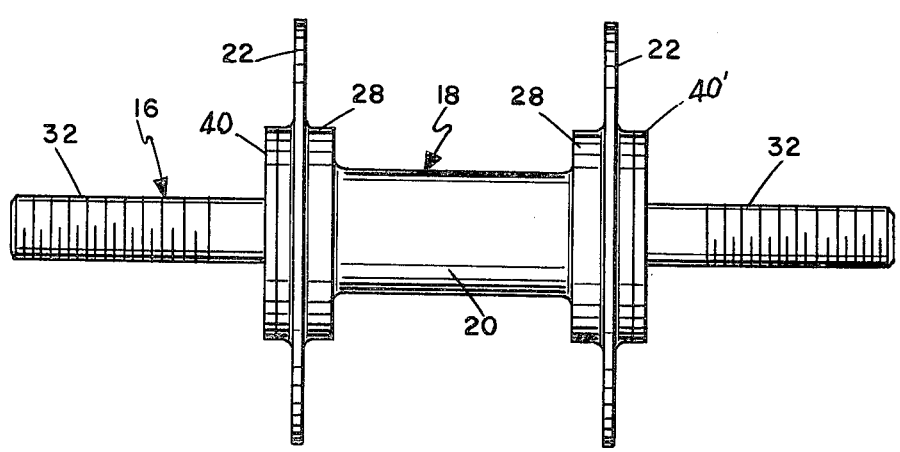
FIG. 6 is a side elevation of the hub assembled for a front wheel.

An annular retainer 40 is shown at the left end of the housing in FIG. 2. This retainer has openings mating with threaded screw holes 38 by which the retainer is screwed directly into the end 28 of the axle housing. An identical annular retainer 40′ can be used on the other end of the axle housing to produce the result shown in FIG. 6 which is a front wheel hub.

Figure 5:
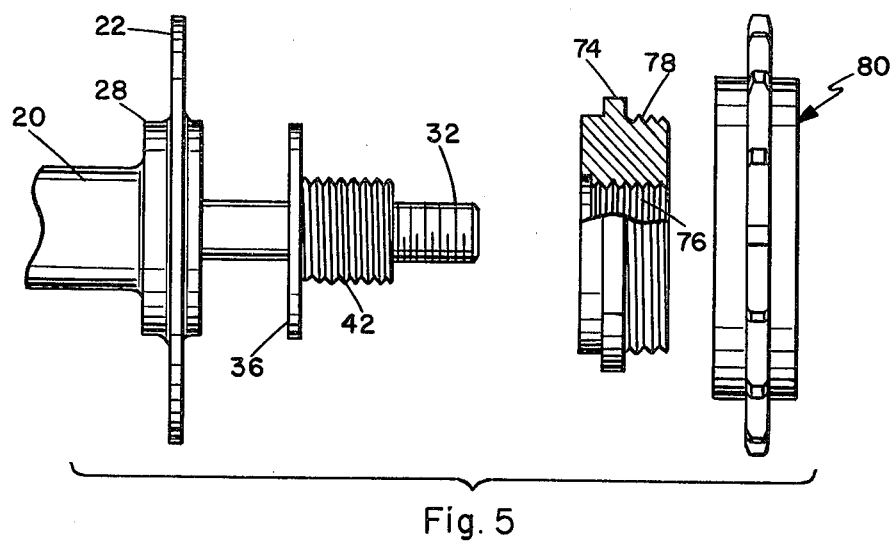
FIG. 5 is an exploded side elevation view showing an adaptor for attaching a conventional sprocket and ratchet.

Turning again to FIG. 2 it can be seen that the right end of the axle housing has the same threaded bores 38 as the left end, but instead of the plain ordinary retainer, a retainer 36 is used which includes an externally threaded sleeve 42 which defines an extension of the axle housing as well as a mount for freewheel mechanism 44. Thus when this retainer-sleeve combination is used, the result is a hub for a rear wheel. By simply removing retainer 36 with its threaded sleeve and replacing it with the retainer 40′, the front wheel hub is produced. The freewheel assembly 44 has a greatly reduced interior diameter to adapt to the mounting sleeve 42 and is thus particularly compatible with the present system and would not function on a conventionally manufactured hub which uses a freewheel mechanism of larger internal diameter shown at 80 in FIG. 5.

In addition to the fact that only one manufacturing process need be used for both hubs and inventory costs would be lower, it would also be possible in some instances to convert a rear hub to a front hub if some damage occured to the freewheel mechanism support structure which would not otherwise interfere with the operation of the hub.

Figure 3:
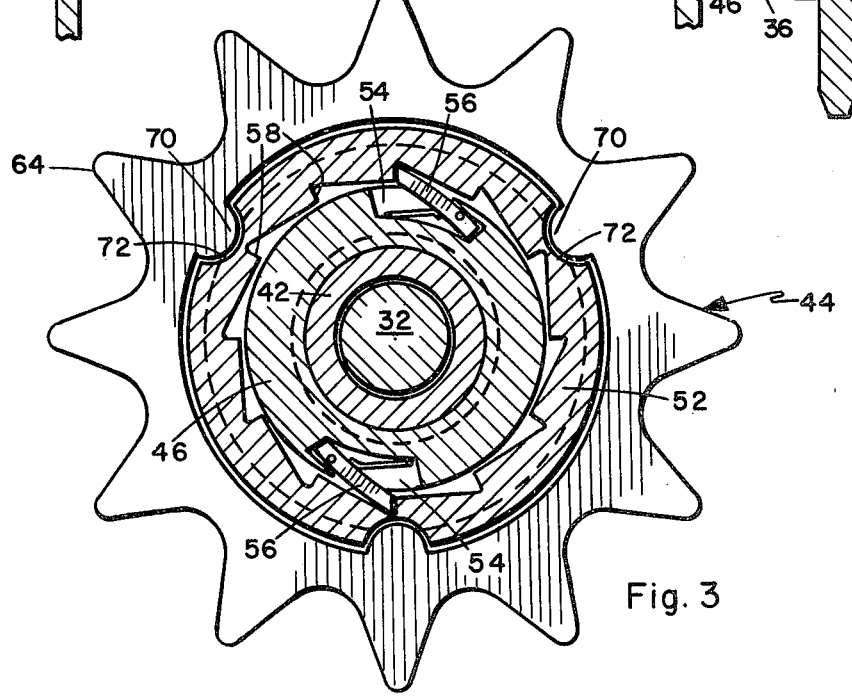
FIG. 3 is a sectional view taken on line 3—3 of FIG. 2.

Turning now to the freewheel assembly itself, the internal mechanism is best shown in FIGS. 2 and 3. The radially inner bearing race includes a first ring 46 and a second threaded retainer 48 which is installed to capture the bearings 50 after the outer race 52 is mounted.

It is clearly seen from FIG. 3 that the ring 46 has spaced peripheral gaps 54 which contain outwardly spring-biased pawl elements 56. These pawls cooperate with the inwardly directed teeth 58 of the outer ball race to define a ratchet mechanism which is typical in the art and permits the rear wheel to be chain driven when the cyclist is pedalling, but allows the pedals to remain stationary and not be driven forward by the rear wheel when the cyclist is not pedalling.

The outer ball race member 52 has an annular rib 60 projecting beyond the external threaded surface 62 which backstops sprocket 64 which is secured axially by threaded retaining ring 66. This ring has oppositely positioned hollows 68, shown in FIG. 4, to enable the ring to be simply removed with a spanner tool.

The sprocket element 64 is thus easily removeable and replaceable by simply taking the ring 66 off of the assembly with the spanner tool. Sprockets available for use on the freewheel mechanism range at least from 13 to 22 teeth, so a great variety of ratios is provided. It will be noted that the changeable part of the sprocket or freewheel mechanism is reduced to the absolute simplest structure possible which is a planar annular member having the teeth on it. This minimizes the cost of replacement and maintaining a small inventory of different sized sprockets.

Figure 4:
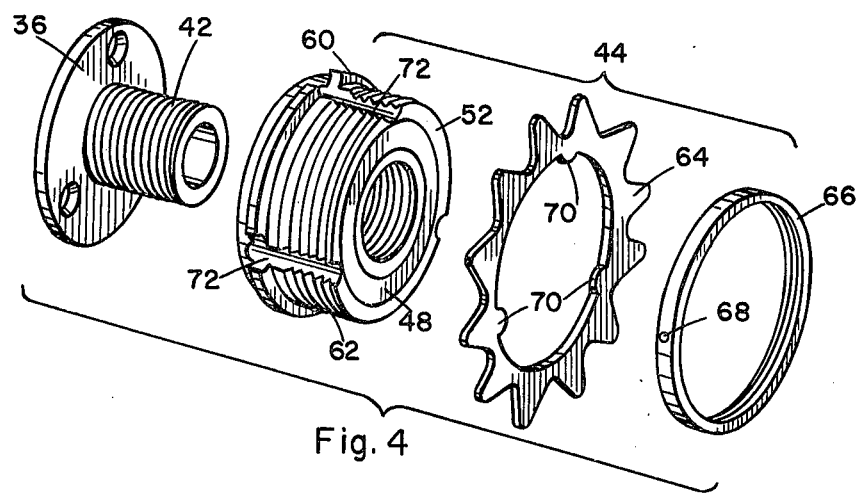
FIG. 4 is an exploded view of the interchangeable sprocket and ratchet components.

The sprocket is secured against angular motion on the freewheel mechanism by three equally spaced tabs 70 which slide along three hollowed tracks 72 best seen in FIG. 4. The exploded view of FIG. 4 is indicative of the simple way in which both the sprocket is slid over the freewheel mechanism and retained by the ring 66, and then the freewheel mechanism screwed on to the sleeve 42.

In addition to the versatility described above, that is the ability of the single hub to be adapted to front and rear use, and the interchangeability of the sprocket member for the rear application, one further feature of adaptability is incorporated in the invention by the use of a special adaptor unit 74. This unit is internally threaded at 76 to slip over the adaptor sleeve 42, and has external threads 78 on to which can be mounted a conventional freewheel mechanism 80 if, for example none of the sprockets 64 are available.

Both front and rear configurations are adaptable to all 10 speed and coaster brake bicycles now in use. It is foreseen that this simplified and versatile assembly, which cuts production costs without a commensurate reduction in product quality, will replace hub units now in use over a period of time, especially in the off-road market, to the benefit of manufacturers, dealers, and riders alike.

I claim:

1. A convertible bicycle hub assembly adaptable for use as both a front and rear hub comprising:
    (a) an axle housing;
    (b) an axle journalled in said housing; and
    (c) a mounting for a freewheel mechanism, said mounting being removably mounted to one end of said housing to define an externally threaded sleeve extension of said axle housing such that when said sleeve is mounted on said housing and a freewheel assembly is mounted on said sleeve, said bicycle hub assembly is adapted for rear wheel use.

2. Structure according to claim 1 wherein said sleeve extension includes an integral retainer for an axle bearing and said retainer is mounted to the end of said axle housing to support said sleeve in extended relation thereto.

3. Structure according to claim 2 and including an annular bearing retainer mountable to the end of said axle housing to replace said extension sleeve and integral retainer to convert said hub for front wheel use, said annular retainer having the same means of mounting to said axle housing as said integral retainer.

4. Structure according to claim 3 wherein said axle housing has two ends and houses a pair of axle bearings adjacent said ends and said ends are identical and each end is adapted to receive alternatively said annular retainer or said integral retainer.

5. Structure according to claim 4 wherein said axle bearings are each sealed dustproof precision bearings.

6. Structure according to claim 5 wherein said axle housing has a generally cylindrical co-axial bore to house said axle, and said bore is expanded near the ends of said housing to define shoulders for bearing seats and said axle is of reduced diameter externally of points adjacent said shoulders to engage said bearings and prevent floating of said axle.

* * * * *